3,007,890
FRICTION ELEMENTS AND METHOD OF
MAKING THE SAME
Sumner B. Twiss, Birmingham, and Edward J. Sydor, Rochester, Mich., assignors to Chrysler Corporation, Highland Park, Mich., a corporation of Delaware
Filed May 7, 1959, Ser. No. 811,764
21 Claims. (Cl. 260—38)

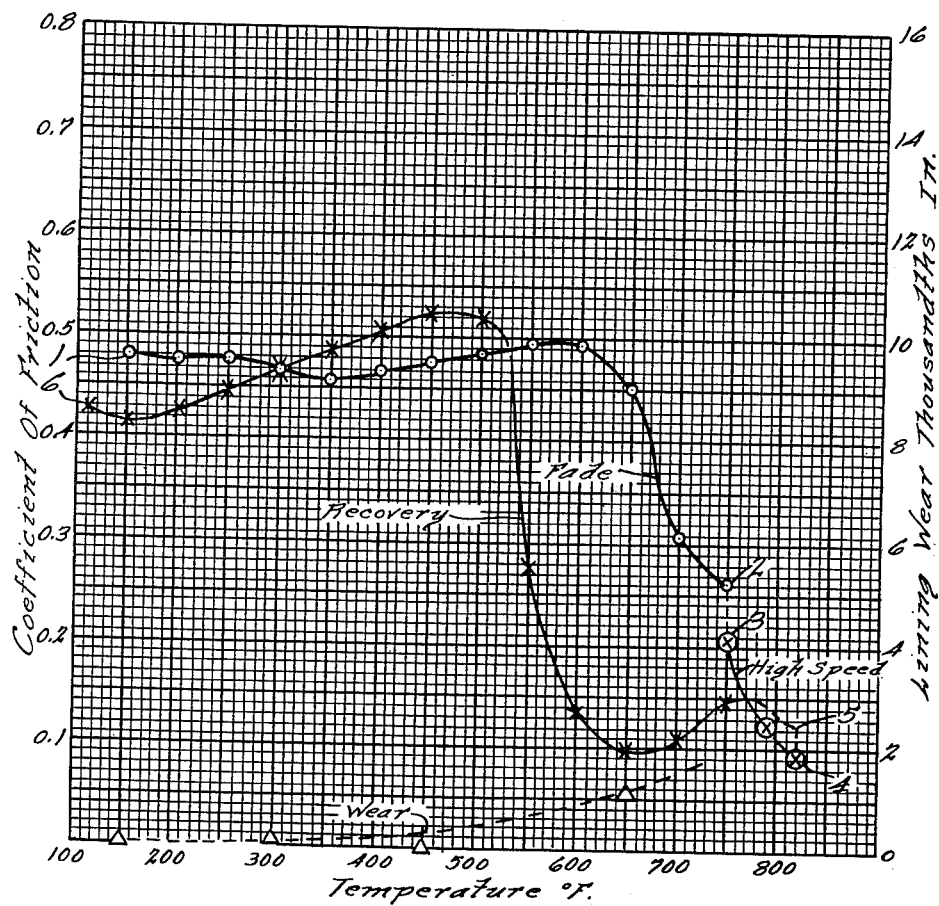

This invention relates to friction elements and to processes for making the same. More particularly the present invention relates to friction elements useful as linings or facings in brakes, main clutches, and band and clutch facings of power transmission speed control structures of power driven devices such as automotive vehicles. It especially concerns linings for manual and power brakes. Friction elements of this character as now made, are composed in general of a reinforcing friction material such as asbestos fibre bonded with an organic binder and other organic or mineral friction controlling agents and may include other extending materials for imparting specific properties or characteristics to such friction elements, for example, heat resistance, resistance to moisture sensitivity, wear and noise.

This application is a continuation-in-part of our co-pending application Serial No. 517,274, filed June 22, 1955.

It is known that friction elements which are intended for heavy duty brake or clutch operations in motor vehicles must withstand severe service conditions. In use they are subjected to rigorous treatment by repeated and oftentimes prolonged braking or clutching applications which develop high temperatures, above 500° F., in the friction elements, these temperatures frequently exceeding 1000° F. on the friction surface of the elements and progressively decreasing inwardly of such surface. These high temperatures, especially when occurring during high speed stops or following repeated applications of the brakes, tend to depolymerize or otherwise decompose the organic binder substances heretofore employed as the principal essential ingredients of the vulcanized binders in the friction elements, such ingredients comprising vulcanizable natural rubber with or without vulcanizable sythetic rubber additions, and various resins such as phenol aldehyde resins and oil modified resins. Decomposition of the friction material results in the formation of gaseous or liquid products of heat decomposition. In some cases this causes marked softening of the friction element with consequent loss of braking efficiency. In other cases, the depolymerized or otherwise liquid products of heat decomposition appear on the friction surface of or within the friction elements so as to cause the friction elements heretofore employed to exhibit a loss of stability of friction characteristics originally existing, and to produce after vigorous braking application a condition which automotive engineers customarily refer to as "lining fade."

In many instances the aforesaid liquefied decomposition products may produce a glaze on the surface of the friction element. This glaze must be removed by subsequent brake or clutch operations to restore the original surface conditions. If subsequent operations are unable to eradicate the glaze, the friction element will remain at a low level of friction and yield an unsafe functioning of the device in which it is used. Moreover, the aforesaid decomposition may in some instances cause an excess of abrasive material of the lining composition to be present on the friction surface and produce a condition known as "over recovery," the friction element then having a coefficient of friction upon cooling exceeding that which the friction element possessed originally. Since it is desirable to maintain the stability of friction characteristics of the friction elements, it will be understood that these conditions are to be inhibited and preferably avoided.

A further problem heretofore associated with known friction elements has been the impossibility to achieve in a satisfactory manner a relatively high level of substantially uniform friction action over a wide temperature range of the friction element. By high level of friction we mean a coefficient above 0.4. This property is much sought after because modern brake and clutch operations can be made more effective if the friction elements possess this feature. It will be understood for instance that for braking stops made at the same speed and at the same rate of deceleration, a friction material which possesses a high level of friction action and which is capable of maintaining the same over a wide temperature range will provide more positive response and will require a lower pedal effort than would be true of a conventional friction material neither possessing a uniform level of friction action or a high friction ability over a substantial temperature range.

Because of the tendency of friction elements made with binders essentially of vulcanized natural rubber to decompose at high temperatures and lose their frictional characteristics under varying operating conditions, manufacturers have in the past tried to avoid binders of this character and to employ instead as the primary binder, because they are believed to possess superior heat resistance than natural rubber hydrocarbon or synthetic rubber elastomers, binders essentially of synthetic resins of the phenol-aldehyde type. However, loss of tackiness needed for high green strength in the initialy uncured friction elements formed by so-called wet methods, and excessive hardness, both caused by the use of too much of such synthetic resins has resulted in blends of vulcanizable rubber and synthetic resin in which the synthetic resin constituent was still the major ingredient. Moreover, in some cases synthetic rubbers of the butadiene-styrene copolymer types for instance those known in the trade as "GR–S" have been used for the rubber ingredient and it has been suggested that certain synthetic rubbers of the butadiene acrylonitrile copolymer types (Buna N) for example those known in the trade as "Hycar OR," "Perbunan," or "Chemigum" be used. However, we have found that none of the compositions in which such synthetic rubber binders have heretofore been used commercially or suggested as additions to the primary synthetic resin binder will consistently provide as described above, a friction element having a high substantially uniform level frictional stability over wide temperature ranges nor will they be even substantially free of "fade" or "over recovery" when subjected to vigorous operation in the devices in whic they are employed.

It is also significant that heretofore it has been deemed a "must" in using binders of the aforesaid character in friction elements to employ a vulcanizing agent, for example sulphur, or such an agent and an accelerator to obtain satisfactory results. We have now discovered that where the friction elements operate against a cast iron or other ferrous surface, as in a brake device, the presence of a vulcanizing agent such as sulphur in the composition of the friction element materially contributes to burning of the braking surface after repeated hard stops of a vehicle are made therewith. The reason for this action is not definitely known but it is believed that the aforesaid decomposition occurring in the friction element at the high temperatures developed therein causes sulphur to be liberated to bring about a burning condition. The hardness of the friction element in which sulphur is a factor may also be a contributing cause.

It is therefore a primary object of this invention to provide an effective composition for friction elements composed essentially of a suitable binding material, fibrous reinforcing friction material and granular friction and other modifying fillers and particles which will produce friction elements possessing exceptional friction stability under all of the severe conditions encountered in brake and clutch applications in modern light and heavy high speed vehicles or other devices and over a wide temperature range and at high temperatures. Friction elements made by the compositions of this invention have considerably better fade resistance than known friction elements commercially available. Moreover, they recover rapidly after excessive heating when braking has produced a fading condition and they do not over-recover on cooling but return substantially to their original friction level.

A further object of this invention is to provide novel compositions from which friction elements having a higher level of frictional coefficient than that available in commercial friction elements may be obtained and wherein friction elements made from the same composition will all consistently exhibit this higher friction level and retain the same under all conditions of operation.

In the art of brake lining manufacture high coefficients of friction in linings have always had associated with them a tendency to burn or score brake drums. An object of the present invention is not only to provide a friction material having the previously mentioned superior friction characteristics but one which in addition thereto is capable of producing a brake lining which is not subject to burning or scoring brake drums.

In addition, it is an object to provide a friction material that will operate in almost any type of braking system and under all conditions of operation without being subject to objectionable noise or chatter i.e., the brakes will operate quietly. In this connection we have discovered that shear elastic constants of the friction elements have a difinite relationship to their hardness and to noise; the higher the shear elastic constant or hardness, the more the noise, assuming all other factors to be held constant. The friction elements of this invention especially those substantially free of sulphur, have extremely low values of hardness some even less than —100 Rockwell (M scale) and exhibit minimum noise.

Moreover, it is an object to provide a composition for friction materials which may if desired be formed into friction elements by known methods of manufacture of friction elements.

Other objects and advantages of our invention will appear from the following description and from the claims.

In the drawing is a graph illustrating the fade, high speed effect, recovery and wear characteristics of a typical brake lining made in accordance with our invention.

Broadly stated, our invention is among other features, directed to a heat cured friction product or element composed of a substantially homogeneous composition consisting essentially of a major portion of friction particulate material and a minor but substantial portion of a primary binder with or without other binders.

The objectives of our invention are best accomplished by employing as the primary or sole binder certain synthetic elastomeric materials or rubbers comprising a vulcanizable or heat hardenable acrylonitrile-butadiene copolymer. Acrylonitrile-butadiene copolymers are generally synthesized by copolymerizing in the presence of suitable known catalytic ingredients and modifying agents a butadiene hydrocarbon of the type

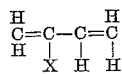

where X represents either hydrogen or an alkyl group and an acrylonitrile of the type

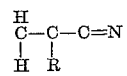

where R represents either hydrogen, as in acrylic acid nitrile per se, or an alkyl group as in meth-acrylic acid nitrile to form a synthetic rubber having the general formula as follows:

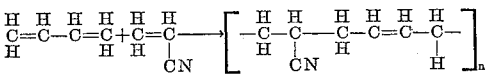

The butadiene-acrylonitrile copolymers we use as primary binders in the present invention are those made by copolymerizing the monomer butadiene with a relatively high percentage of acrylonitrile (preferably more than 35% by weight of the total weight of the combined butadiene-acrylonitrile copolymer) to a highly cross-linked polymeric state having a high gel fraction and a high molecular weight and which are substantially insoluble in organic solvents.

Such binders when properly cured provide a copolymer bond that is maintained in a relatively soft condition and they facilitate the obtaining of friction elements whose noise factor is considerably reduced over prior friction elements and whose effectiveness is increased while maintaining good fade resistance and recovery characteristics.

Butadiene-acrylonitrile copolymers in the liquid state or soluble up to but not including the gel state are specifically excluded as primary binders in the present invention. These correspond relatively speaking to low molecular weight copolymers and require the use of vulcanizing agents in substantial amount or require long periods of cure to completely cross-link to inhibit subsequent liquefaction and glaze forming in the friction elements by the lower weight fraction of the components of such low molecular weight binders. When substantial amounts of vulcanizing agents or long cures are used, excessive hardness of the friction elements results which renders it most susceptible to noise production when used in heavy duty brakes.

"Hycar 1411" made and sold by the B. F. Goodrich Chemical Company is a commercially available high gel butadiene-acrylonitrile copolymer suitable for use as a primary binder in the present invention. It is a powdered material of a particle size less than 20 mesh, contains between 38 to 42% by weight of acrylonitrile and about 8% non-rubber components including soaps, fatty acids, antioxidants, and clays for keeping the crumb dry; has a specific gravity of about 1.0, a Mooney (ML4 at 212° F.) viscosity of 100 to 120 and although it is stated to be insoluble in organic solvents in its unvulcanized form we have nevertheless found that it can be swollen slightly by organic solvents and still be very satisfactorily incorporated with the other friction components of the friction elements in a Baker Perkins type mixer.

Although as indicated above the high molecular weight butadiene-acrylonitrile copolymer binders aforesaid will constitute the primary or sole binder ingredient in the friction elements of this invention we have found that a small portion of the total binder preferably in amount less than 15% by weight of the total binder may be replaced by suitable liquid or soluble type butadiene-acrylonitrile copolymers or by suitable resins to impart particular properties as noted below, other than optimum bonding characteristics, to the friction elements.

Where a substituent resin is employed it will preferably be a phenol-aldehyde or modified phenol-aldehyde resin such giving improved oxidation resistance to the bond. Where an oil modified phenol-aldehyde resin is used such resin product should preferably contain more than about 88% by weight of the phenol-aldehyde reaction product. Amounts less than this provide free oil at elevated temperatures conducive to bleeding and hence "fade." Moreover when the resin substituent is derived from a phenyl borate, and an aldehyde as described in Twiss et al. Patent 2,623,866 exceptional resistance to moisture sensitivity is a further property imparted to the friction element and when metal modified resins are employed somewhat higher levels of coefficient of friction are attainable.

Examples of other resins which may be used are the thermosetting silicone resins such as Dow Corning Company silicone resin "No. 7501" which is a solventless organic-polysiloxane resin which when reacted with peroxides such a dicumyl peroxide forms an insoluble, infusible product, the thermosetting urea formaldehyde resins such as Rohm and Haas "Uformite F240N" which is the reaction product of urea and formaldehyde which may be brought to an infusible state by further reaction with suitable conventional curing agents and catalyst; the thermosetting mealamine formaldehyde resins such as Rohm and Haas "Uformite MM46" which are the reaction products of cyclic trimers of cyanamide with formaldehyde; and the epoxy resins such as Michigan Chrome Corporation "Micron A 400" (containing 87% epoxy resin) which are resin polymers produced by reacting epichlorhydrin with bisphenol A.

By preference the resin content of the binder of the friction elements will be kept at a relatively low amount in order that undesired hardness is not imparted to the friction element. Where the amount of resin other than oil modified phenolic resin (which may be used in slightly greater amounts) exceeds the limits given above, the hardness may increase to such an extent, that a high frictional level in the friction element without objectionable noise and/or drum burning characteristics is impossible, and is, on the contrary promoted. We have discovered that friction elements currently made for the brake lining industry have these failings and in each instance resins in amount exceeding 50% of the binder have been specified as essential and this in order to provide superior heat resistance over the natural rubber or synthetic elastomers heretofore used which were deficient in heat stability and produced undesirable liquefaction and decomposition at elevated temperatures.

We further preferably maintain the resin content at a relatively low amount in order to maintain optimum tackiness and extensibility in the binder and thereby high green strength in initially formed uncured friction elements made by so-called wet methods.

We have discovered that friction elements made by this invention will yield an exceptionally stable, high level of friction over a wide range of temperature when the binder material including primary butadiene-acrylonitrile binders described above as useful herein are employed in amounts not less than 11% by weight and not more than 22% by weight of the total weight of the dry ingredients (including the primary binder aforesaid) going into such element or stated otherwise when the amount of binder is not less than 25% by volume and not greater than 55% by volume of the dry ingredients going into such element.

A volume percentage less than 25% yields rapid wearing friction elements which are susceptible to scuffing over high pressure points or rough drums when subjected to severe brake applications. A volume percentage of over 55% yields low wearing, low effectiveness linings which do not meet the objectives of the present invention for high coefficient of friction elements.

We have further discovered that the high molecular weight, high acrylonitrile content, butadiene-acrylonitrile copolymer, synthetic, rubber-like elastoprene used in this invention may be cured or cross-linked to give superior stable friction elements having a high level of friction coefficient at high temperatures and over a wide range of temperatures, either in the presence of or in the complete absence of vulcanizing agents such as sulphur or of resins by effecting such curing of the elements at temperatures above 350° F. and below about 600° F.

Where a vulcanizing agent such as sulphur is present in amounts up to 10% by weight of the copolymer, lower curing temperatures and somewhat shorter cures are possible than where no vulcanizing agent is present. However, the presence of sulphur in the composition promotes excessive hardness in the friction elements and as we have discovered induces burning and scoring of brake drums during vigorous braking operations producing high temperatures and hence is preferably avioded. In any event the amount of vulcanizing agent in the composition should exceed 10% by weight of the binder used.

As stated above, friction particulate extending and modifying materials will be used with the proper quantity of gel type acrylonitrile-butadiene copolymer primary binders and additive binders described above of our invention in making suitable friction elements.

By preference, such particulate materials will be heat resistant and essentially composed of filamentous and granular friction particles. Best results are attained when the filamentous ingredients predominate and constitute at least about 40% by weight of the dry ingredients of the composition. In this connection, asbestos fibre is preferred for its desirable high heat resistant handling and reinforcing properties. Moreover, best braking performance is obtained when the particulate materials are inorganic in character although a substantial portion may be organic when in a form heated to render them substantially infusible at temperatures of 600° to 900° F. and preferably higher. Normally it is preferred not to use organic particulate ingredients in amount exceeding about 30% by weight of the dry ingredients and not more than about 5% to 10% when such materials have not been heat treated as aforesaid.

Examples of filamentous particulate materials which may be used are inorganic fibres such as asbestos fibre, steel wool, bronze fibre, glass fibre, and calcium silicate fibre ("wollastonite"); organic fibres such as cellulose fibre ("Solka Floc") and synthetic resin fibres such as "Acrilon," a polyacrylonitrile fibre made by Chemstrand Corporation; "Orlon," a polyacrylonitrile fibre made by Du Pont; "Dacron," a polyethylene terephthalate fibre made by Du Pont; and synthetic resin fibres of these types heat treated to render them infusible at temperatures of 600° F. and higher.

Examples of other particulate friction materials and fillers are particles of zinc oxide, barytes, rotten stone, zinc dust, Alundum, graphite, molybdenum disulfide, iron oxide, and organic friction particles such as Cardolite 753, Chrysler B196 and Chrysler B221. Cardolite 753 is an organic resin particulate made by Minnesota Mining and Manufacturing Company. It is prepared by reacting together and heat curing to the infusible state the residue of the distillation of cashew nut shell liquid, furfural and diethyl sulfate, as described in U.S. Patent No. 2,317,587 and then comminuting the infusible mass to a granular material.

B196 is an organic friction particle. It is made by comminuting the heat reacted and cured product of a resin solution of the following composition:

| | Percent by weight |
|---|---|
| Phenol | 60.0 |
| Boric acid | 10.0 |
| Polymerized cashew nut shell liquid | 2.5 |
| Paraformaldehyde | 27.5 |
| | 100.0 |

The resin solution is prepared by heating the phenol and boric acid to 175° C. and removing the water of reaction. Toluene and 12.5% of the paraformaldehyde are then added and refluxed for four hours to remove more water of reaction. Then an additional 12.5% of paraformaldehyde in toluene and n-butanol is added and refluxed for five hours. The remaining 2.5% paraformaldehyde in toluene and n-butanol is then added and refluxed for 2½ hours and more water of reaction removed.

The resin solution obtained is then air dried for 48 hours to remove the solvent, then heated to 165° C. for four hours, then pulverized and heated an additional two hours at 165° C. The comminuted material is then sifted through a screen and the fraction passing a 20 mesh screen is further heated at 165° C. for an additional two hours. The result is a heat cured infusible friction particle.

B221 is an organic friction particle. It is made by comminuting the heat reacted and cured product of a resin solution of the following composition:

|  | Percent by weight |
|---|---|
| Phenol | 44.5 |
| Boric acid | 7.4 |
| Polymerized cashew nut shell liquid | 2.0 |
| Paraformaldehyde | 26.3 |
| A-17 ester solution | 19.8 |
|  | 100.0 |

The A-17 ester solution is prepared from the following solution:

|  | Percent by weight |
|---|---|
| Aluminum isopropoxide | 32.8 |
| Pentadecyl phenol | 61.2 |
| Acetic acid (glacial) | 4.7 |
| Polymerized cashew nut shell liquid | 1.3 |

The A-17 ester is made by refluxing the aluminum isopropoxide and pentadecyl phenol in xylene solvent and stripping off water of reaction. Glacial acetic acid is then added and additional water of reaction removed. Polymerized cashew nut shell liquid is then added and the solution heated and mixed. The resulting compound is cut back with xylene to the point where 14.1 grams of it contains 1.0 gram of aluminum computed as aluminum oxide.

The B221 resin solution is made by heating to 128° C. and refluxing the boric acid phenol in toluene and water of reaction stripped off. The A-17 ester is then added and the mixture heated and refluxed one hour at 100° C. The polymerized cashew nut shell liquid is then added and the mixture refluxed at 128° C. for 1½ hours. Small increments of paraformaldehyde in n-butanol and toluene are then added over a ten hour period at 100° C. and water of reaction removed. Then additional amounts of paraformaldehyde added over a six hour period while the reaction temperature is held at about 110° C.

The resin solution is now mixed with 4.1% paraformaldehyde air dried to remove the solvent, heated to 165° C. for four hours, pulverized and heated an additional two hours at 165° C. The material is then sifted and the fraction passing a 20 mesh screen heated to 165° C. for two hours. A heat cured infusible friction particle results.

It will be understood that the foregoing examples of particulate ingredients are not given by way of limitation, it being quite evident that a wide range of friction additives are contemplated for use in the friction elements of the invention and we do not desire to be confined to those disclosed. Almost any type of additive substance may be used so long as it is of the character and employed within the limits set forth above.

Illustrative compositions designated as X-1, X-2, X-3, etc., containing some of these extending materials are given in Table I below, the amounts stated for each material being given in percent by weight of the dry ingredients of the composition.

TABLE I

*Composition by weight percent*

|  | Copolymers [1] | 5K Asbestos | Sulfur | Zinc Oxide | Cardolite #753 | Resin | Additive 1 | Additive 2 | Press and Cure [2] |
|---|---|---|---|---|---|---|---|---|---|
| X-1 | 22.00 | 49.00 | 2.00 | 4.00 | | | a 11.50 | b 11.50 | C-1 |
| X-2 | 11.00 | 63.00 | 1.00 | 2.00 | | | a 11.50 | b 11.50 | C-1 |
| X-3 | 17.00 | 54.30 | 1.60 | 3.10 | | | a 11.50 | b 11.50 / f 1.00 | F-1 |
| X-4 | 15.00 | 57.80 | 1.48 | 2.72 | | | a 11.50 | b 11.50 | F-1 |
| X-5 | 15.00 | 57.80 | | 2.72 | | | a 12.98 | b 11.50 | F-1 |
| X-6 | 15.00 | 78.80 | 1.48 | 2.72 | | 2.00 | | | C-1 |
| X-7 | 15.00 | 68.80 | 1.48 | 2.72 | 10.00 | 2.00 | | | C-1 |
| X-8 | 15.00 | 68.80 | 1.48 | 4.72 | 10.00 | | | | C-1 |
| X-9 | 15.00 | 78.80 | 1.48 | 2.72 | | 2.00 | | | C-1 |
| X-10 | 15.00 | 68.80 | 1.48 | 2.72 | | 2.00 | c 10.00 | | A-4 |
| X-11 | 13.30 | 55.17 | 1.31 | 2.42 | 8.85 | 1.75 | d 17.20 | | A-4 |
| X-12 | 13.00 | 64.20 | 1.30 | 3.00 | 10.00 | 6.50 | e 1.00 | f 1.00 | A-4 |
| X-13 | 15.00 | 15.00 | 0.30 | 6.00 | | 5.00 | g 40.00 | h 18.70 | A-5 |
| X-14 | 15.00 | 68.80 | 1.48 | 2.72 | | 2.00 | i 10.00 | | A-4 |
| X-15 | 15.00 | 68.80 | | 4.20 | 10.00 | 2.00 | | | A-4 |
| X-16 | 17.00 | 48.80 | | 4.20 | 30.00 | | | | A-4 |
| X-17 | 17.00 | 64.80 | | 4.20 | 10.00 | | j 4.0 | | A-4 |
| X-18 | 17.00 | 68.80 | | 4.20 | 10.00 | | | | A-4 |

[1] Acrylonitrile-butadiene copolymer.
[2] Key to press and cure.

In the table, the copolymer referred to in the first column is in each case of Examples X-1 to X-18 that known in the trade as "Hycar 1411" to which reference has been previously made. Moreover, the additive substances are referred to in the table by lower case letter designations, the key for which is as follows:

(a) Barytes.
(b) Rotten stone.
(c) B-196 friction particle.
(d) Zinc dust.
(e) Paraformaldehyde (curing agent).
(f) Alundum (600X).
(g) Steel wool.
(h) Iron oxide.
(i) B-221 friction particle.
(j) Orlon fibre.

Table I also gives the pressing and curing conditions to be observed for each of the compositions, these being designated by an upper case letter followed by a numeral, the letter representing a predetermined temperature and time of cure, and the numeral, the pressure, temperature, and time required for hot pressing. The key to these is as follows:

*Curing temperatures and times*

A—approximately 1½ hours up to 350° F. plus 6 hours at 350° F.
C—approximately 1½ hours up to 450° F. plus 6 hours at 450° F.
F—approximately 1½ hours up to 500° F. plus 6 hours at 500° F.

*Hot pressing pressure temperature and time*

1—500 lbs. per square inch at 290° F. for 6 minutes
4—750 lbs. per square inch at 290° F. for 6 minutes
5—1,000 lbs. per square inch at 290° F. for 6 minutes In handling the materials forming the composition, all of the dry ingredients which includes the powdered acrylonitrile-butadiene copolymer binder, asbestos, sulphur if any, zinc oxide, barytes, rotten stone, zinc dust, Alundum, steel wool, and iron oxide, for example given in Table I, for any one composition are dry blended for about one hour or until the mixture appears homogeneous. This dry blending may normally be carried out in a Baker Perkins Simplex mixer, dough mixer, or any other dry mixing equipment. The wet ingredients of the composition, primarily liquid butadiene-acrylonitrile copolymers, liquid resins and any friction particles such as Cardolite No. 753 which is a friction dust particle, resin curing agents such as formaldehyde, etc., are blended together, otherwise the friction particles and curing agents are treated as dry ingredients and mixed with the other dry components by blending as described above. The primary acrylonitrile-butadiene polymer is normally employed dry in the form of a powder, granules or shredded material. The copolymer may if desired be swelled or tackified in solvents such as toluene, xylene, nitroparaffins and combined with the friction particles and curing agents to form a wet mixture.

Assuming that a separate slurry or dispersion of resin solution containing friction particles and curing agents has been prepared, such is added to the dry mix ingredients in a suitable mixer, for example a Baker Perkins mixer, a Day mixer, or a W & P mixer. In this step, sufficient tackifier, i.e., a solvent is preferably added to permit a wet plastic coherent mass to be formed under pressure but which has a consistency adapting it for feed by gravity flow to the screw of an extrusion machine or to the working parts of any other apparatus for processing the composition into elements. In general, as solvents for tackifying we preferably use equi-volume mixtures of butanol and toluene but may employ other combinations of organic solvents which have a swelling action on the copolymer.

The amount of solvent to be added depends upon the formulation of the composition and the purpose for which the end product is to be used. In general, this will range from 10% to 25% by weight of solvent based upon the total weight of the dry ingredients. The use of too large an amount of solvent will reduce the green strength of the formed friction element, will increase the time for drying out the formed element, and most importantly, will cause excessive shrinkage of the friction elements during the drying stage. On the other hand, the use of too small an amount of solvent will not sufficiently plasticize and tackify the composition so that easy forming of the friction elements by any of the wet methods hereinafter more fully described, can be carried out. The use of too low an amount of solvent may also result in poorly bonded, easily cracked and non-homogeneous structures. The time of mixing the ingredients will depend upon the specific mix and may vary from 5 to 30 minutes. The mixing is carried out until a homogeneous blended mass is obtained, a condition which is easily recognized and well known by those skilled in the art. The appearance of the mass may range from that of a damp powder to that of damp rubbery agglomerates of the friction element.

In accordance with this invention, the damp mixed batch of ingredients is removed from the mixer, for example the Baker Perkins mixer aforesaid, and preferably fed into a hopper of a single screw extrusion machine where it is picked up by the screw and forced under pressure to the die at the end of the machine. The extrusion die will have the proper shape and size of opening (slightly oversize to allow for shrinkage) to provide the required width and thickness of friction element desired. Depending upon the formulation, the die may be either heated or cooled. A heated die is preferably used for materials containing a low solvent content or where the mix is very viscous. On the other hand, a cooled die is preferably used for making friction elements where the mass has sufficient plasticity to flow easily. The rate of extrusion is so controlled that a homogeneous continuous strip of friction element of maximum density is formed. The speed of extrusion is dependent upon the mix and may vary from 5 feet per minute to 60 feet per minute. The strips of green friction element material are preferably cut off as extruded to give the desired length of friction element, and these are preferably placed in a steam heated oven to evaporate the extrusion solvents and plasticizers.

While the elements of this invention will preferably be formed as aforesaid, it will be understood that they may be produced by any of the several conventional techniques known in the art. For example, in producing brake linings, the damp mix may be extruded through a ram extruder or a modified screw extruder such as the Baker Perkins "Ko-kneeder." Moreover, the friction elements may be formed using the same mix described above on a profile-calender machine, sometimes referred to as a wire-back machine or roll-extruder. By employing a larger amount of solvent in the mix, the brake lining mix may be handled on a so-called sheeter machine, whereby a continuous sheet of friction element material is built up on a hot roll while being compressed by a counter-rotating cold roll. Where a resin having a high flow characteristic is included in the ingredients or where the resin content is at the upper end of the range given above, the friction elements may, if desired, be processed by the so-called dry molding technique. In this type of processing, all the ingredients are dry mixed or, any solvent in a previously formed wet mix such as described above, is removed to give a homogeneous dry mixture. This dry mixture is then evenly distributed in a pre-form mold or in the final mold cavity. Heat and pressure are then applied to the mold in a press to densify and partially cure the mass so that a dense coherent structure of the correct size and shape is formed. The friction elements so formed are then removed from the mold and cured in an oven at elevated temperature until the desired cure and hardness is obtained. The dry molding process tends to be more expensive in carrying it out than the wet processes herein above described.

Thus it will be apparent to those skilled in the art that by varying the amounts of solvent or omitting solvent entirely, different techniques may be employed for the character of a mix obtained.

After forming the friction elements to the approximate dimensions required therefor, solvents and plasticizing agents are then preferably removed. The length of the dry out period will depend upon the amount of solvent and plasticizers present in the mix, the thickness of the friction element, the dry out temperature, and whether or not a reduced pressure is employed to accelerate removal of solvent from the element. In practice, we have found that times of 12 to 48 hours at temperatures of 120° F. to 150° F. are satisfactory for sections of friction elements about ¼" thick, these drying periods of course being possible of reduction where higher temperatures of drying are employed.

Following drying and before the friction elements are cured, densification of the friction composition is preferably carried out. This is effected, for example, by pressing the flat elements between heated platens in a hydraulic press. The pressures are not critical, such being from a few pounds up to 2,000 pounds per square inch. However, for friction elements of the subject invention unit pressures in the order of 500 to 1,000 pounds per square inch at a temperature in the range of 250° F. to 320° F. are preferred and found satisfactory. The dwell time in the press is also not critical and can range from two to ten minutes depending upon the thickness of the friction element and the specific temperature chosen for the densification process. It will be understood that the dwell time in a pressure activated mechanism may be reduced to a matter of a few seconds if a separate preheating step to soften the binder is used. In this densification procedure, the elements are preferably densified to within a range of 75% to 95% of theoretical density.

Following densification, the friction elements while still hot or following cooling to room temperature, are formed to produce a curved segment having substantially the same radius of curvature as the radius of the brake drum or other device with which the friction element is to be used. Of course, if the elements are to be employed in flat condition, such forming is not necessary. The shaping process may be satisfactorily performed manually by forming the elements over a drum or cylinder of correct radius, or by machine feeding the friction elements over a drum while exerting pressure on the friction element by a movable, flexible, continuous metallic band. This forming or curing step is not critical in the manufacture of brake linings but permits more rapid loading of the curing forms subsequently used for the final step.

It will be understood by those skilled in the art that although we have described a procedure where the strips are shaped following densification in flat form, the friction elements may if desired, be densified and curved simultaneously by the concurrent application of heat and pressure while the dry friction elements are held in a curved mold of correct arcuate dimensions.

The substantially solvent-free densified formed friction elements are preferably cured at elevated temperatures for extended periods of time. The exact time and temperature of cure will obviously depend largely upon the particular formulation chosen and upon the desired end properties of hardness and coefficient of friction to be desired. In general, we prefer to operate in the range of 350° F. to 600° F. for periods of time from 1 to 36 hours, the shorter periods of time and lower temperatures of cure yielding softer friction elements which possess improved effectiveness and reduced tendency to produce noise in use. Although it is preferred that the elements of this invention be cured, it may be pointed out that we have made friction elements using the composition of this invention without employing any cure at all and have made friction elements thereby which are exceptionally soft and quiet although possessing a tendency toward "fade" at very high operating temperatures. As will hereinafter be evident, the desired hardness of the friction element can be controlled to some extent by the proper selection of time and temperature, a higher temperature of cure requiring a shorter curing time and a lower temperature of cure requiring a longer curing time.

When the friction elements of this invention are to be used in connection with drum brakes, assembly of the friction element to the brake shoe will be facilitated by curing the lining in a curved form so that the inside radius of the friction element will be the same as the outside radius of the shoe. For this purpose any conventional curing form such as a rigid drum or pipe to form the inside radius may be employed and pressure may be supplied to the outer surface of the uncured element by the use of a screw tightened or spring-held flexible metal strip. In order to attain high rates of production, a multiple curing jig known in the trade as a "lunette" may be used. In such a procedure a nesting group of crescent-shaped perforated metal assemblies are used to hold twenty or more pieces of friction element material at one time. A sandwich construction is built up consisting of a crescent-shaped metal part, a piece of lining, another crescent-shaped part, another lining, etc., until the pack has reached a sufficient height. A rigid frame is then placed around the pack and pressure built up by tightening a threaded bolt in the frame. Variations of the aforesaid method, as will be apparent to those skilled in the art, may be used to support the friction elements of this invention during cure.

In curing the green friction elements, the assembled packs thereof described above are preferably placed in an oven provided with suitable means for inducing high temperatures in such chamber. Mechanical convection of air is preferably provided to maintain uniform temperatures within the pack of linings and to prevent overcure, burning, or non-uniform cure of the elements. It will be understood that the friction elements may be placed directly into a hot oven. However, in the practice of this invention, it is preferred that the friction elements be placed in a cold oven and a long steady increase of temperature up to the desired cure temperature be provided. Such procedure avoids the formation of blisters, gas pockets, and fissures in the friction elements caused by the rapid evolution of gaseous material. Consequently, uniformity of cure throughout the pack is thereby facilitated.

Another method of curing which may be used in place of the batch process of oven curing is to employ a continuous belt or chain passing through an oven having progressively higher temperature zones so that the usual time temperature relationships are satisfied. In all cases, whether by batch curing or belt curing, curing of the friction elements in the maximum temperature zone for at least one hour is desirable.

The cured shaped elements or segments of friction material after cooling and removal from the oven or other curing chamber are processed in the conventional manner by cutting or grinding to shape and by grinding the surfaces of the friction elements.

Although we have specifically described the making and curing of friction elements particularly adapted for friction lining application, it will be understood that the novel compositions of this invention are, as has been previously indicated, suitable for many other applications such as clutch facings, friction facings for disc brakes, clutch and brake bands for automatic transmissions and the like. To fabricate parts for any specific use obviously requires only the substitution of a specific processing technique for the one described.

The friction elements produced by the novel compositions of this invention have unique characteristics which are best understood by reference to selected physical readings and data on frictional properties. Table II below gives such data for typical friction elements of this invention and likewise enables a comparison thereof with representative commercial friction elements which are believed asserted by brake lining manufacturers to possess superior properties in one or more respects.

In order to facilitate an understanding of the information listed in Table II some description of the designations given in the table will be helpful. Thus the first column of the table gives the material designation. Those represented by X numerals designate friction elements made in accordance with the subject invention, and those listed by upper case letters represent typical present-day commercial products. The second column of the table gives the hardness of the friction element which in most cases is the Rockwell "M" hardness determined according to Procedure D785–48T of the ASTM Standards for plastics. Column 3 of Table II gives the density of each material ascertaining by calculating the volumes from linear measurements of regularly shaped pieces of the friction elements and from the weight of the same specimen. The fourth column of Table II gives the percentage of theoretical density. This is determined by calculating the theoretical density of the friction element from the known weights and densities of the ingredients making up the same and from the calculated volumes that each ingredient occupies in the sample. The "percentage of theoretical density" may be defined as the ratio of actual density determined by the weight-volume measurements, divided by the theoretical density.

For materials whose exact composition is not known, another technique known as "oil asborption" may be employed to determine the percentage of theoretical density. By such procedure, weighed samples of the friction elements are immersed in SAE 90W engine oil at 90–95° C. for 24 hours. The samples are then weighed and the increased in weight of the sample is determined and expressed as the percent oil absorbed in the equation shown below. The percentage of theoretical density can be calculated from the oil absorption data by the following formula:

$$\text{percent } TD = 100\left[1 - \frac{d}{0.86} \cdot (\text{percent } OA)\right]$$

where percent TD=percentage of theoretical density, d=density of sample, percent OA=percentage of oil absorbed, 0.86=density of SAE 90W oil.

Columns (e) to (n) of Table II give properties of the linings which are determined by running the samples against cast iron on a so-called friction dynamometer. A brief description of this procedure will make clear the significance of the friction data presented. A small sample of friction material (1" x ½" x 3/16") is bounded to a steel mounting block by means of a suitable brake lining bonding cement. The block is then mounted on the underside of a beam and pressed against a flat cast iron disk. One end of the beam is rigidly fixed in place and the other end of the beam has a suitable arrangement for adding weights for obtaining the desired load on the friction element. The beam is constrained from moving, except by very slight amounts during operation, by use of a strain ring interposed between the beam and a rigid support. This strain ring is used for measurement of the friction force exerted by the friction material when the disk is rotated. The cast iron disk is suitably connected through a right angle drive and variable-speed transmission to a variable-speed motor so that almost any desired speed of rotation of the disk can be employed. A thermocouple is inserted in the rotating disk and suitably connected to a strip chart recorder so that a continuous record of temperature is obtained. Likewise, the friction force measured by the strain ring is continuously recorded on a chart recorder.

In all of the results given in Table II, the samples were first worn or run in against the cast iron disk for a period of 1 to 15 hours at 338 ft./min. rubbing velocity. The beam was loaded to give a load on the sample of 111 p.s.i. After perfect contact between the friction sample and cast iron disk has been achieved, the load was changed to 151 p.s.i. and the rubbing speed reduced to 25 ft./min. After the room temperature friction became constant, a heater mounted on the underside of the cast iron disk was set in operation and so regulated to supply heat to the disk at the rate of 5° F. per min. Simultaneous recordings of frictional force and disk temperature were made until the temperature reached 750° F. From this run, the coefficient of friction at different temperatures was obtained as given in columns (f), (g), (h), (i) and (j) in Table II. After 750° F. was reached, a five minute run was made at high speed (625 ft./min. rubbing velocity) using the same loading. This gave the high speed coefficient shown in column (k) of the table. At this point, the speed was reduced back to 25 ft./min., the disk heater turned off, and the disk and friction sample allowed to cool to room temperature while running. This is called the recovery phase of the test and recordings of the friction force and disk temperature were continued until the coefficient of friction at room temperature was obtained, which is listed as the recovery coefficient in column (l) of the table. Throughout the so-called fade portion of the test, i.e., that portion while the temperature was increased to 750° F., measurements of wear were taken. The wear in thousandths of inches is shown in column (m) of the table which represents the cumulative wear during the entire test, except for the recovery cycle. A final factor of importance in the performation of friction elements is the fade point which is defined as the temperature at which the coefficient of friction during the fade cycle drops below 0.40. This fade point is recorded in column (n) of Table II.

A typical plot of the fade, high speed test, recovery, and wear of a test on sample number X-15 is shown in FIGURE 1 of the drawing where coefficient of friction and wear values are plotted as ordinates and temperature values as abscissa. Thus the full portion of the curve between points 1 and 2 shows the change in coefficient of friction in going from 150° F. to 750° F. The dotted portion between points 2 and 3 show the change in coefficient occurring in shifting from a speed of 25 f.p.m. (feet per minute) to 620 f.m.p. at 750° F. Curve portion between points 3 and 4 shows the effect of the 5 minute run at high speed. The dotted portion between points 4 and 5 represents the change in again shifting to the lower speed and that portion between points 5 and 6 shows the recovering taking place at the lower speed while the lining cools to room temperature. The lower dotted curve shows the wear characteristics for this sample.

TABLE II.—PROPERTIES OF FRICTION ELEMENTS

| (a) Number | (b) R_M Hardness | (c) Density | (d) Percent Theor. Density | Coeff. of friction at various temps. | | | | | | (k) High Speed Coeff. | (l) Rec. Coeff. | (m) Wear ×10⁻³ in. | (n) Fade Point, ° F.[1] |
| | | | | (e) Room Temp. | (f) 300° F. | (g) 400° F. | (h) 500° F. | (i) 600° F. | (j) 700° F. | | | | |
|---|---|---|---|---|---|---|---|---|---|---|---|---|---|
| X-1 | -2.2 | 1.95 | 98.9 | 0.49 | 0.48 | 0.51 | 0.53 | 0.48 | 0.34 | 0.09 | NR | NR | 670 |
| X-2 | -7.3 | 1.81 | 80.3 | 0.51 | 0.44 | 0.45 | 0.48 | 0.51 | 0.40 | 0.55 | NR | NR | 700 |
| X-3 | 56.7 | 1.91 | 92.0 | 0.41 | 0.43 | 0.45 | 0.46 | 0.42 | 0.25 | 0.11 | NR | NR | 620 |
| X-4 | 41.3 | 1.98 | 96.9 | 0.42 | 0.46 | 0.49 | 0.53 | 0.53 | 0.28 | 0.10 | 0.53 | NR | 655 |
| X-5 | 47.3 | 2.11 | 97.7 | 0.46 | 0.44 | 0.46 | 0.49 | 0.51 | 0.47 | 0.21 | 0.58 | 5.3 | 730 |
| X-6 | 25.3 | 1.63 | 79.5 | 0.45 | 0.44 | 0.46 | 0.47 | 0.48 | 0.41 | 0.43 | 0.54 | 4.0 | 710 |
| X-7 | 14.8 | 1.53 | 83.3 | 0.45 | 0.47 | 0.50 | 0.51 | 0.49 | 0.33 | 0.17 | 0.48 | 2.4 | 680 |
| X-8 | 15.1 | 1.59 | 84.5 | 0.49 | 0.47 | 0.48 | 0.49 | 0.51 | 0.45 | 0.05 | 0.43 | 2.0 | 725 |
| X-9 | 27.4 | 1.76 | 84.4 | 0.42 | 0.43 | 0.45 | 0.47 | 0.48 | 0.45 | 0.07 | 0.49 | 5.0 | 725 |
| X-10 | 17.0 | 1.58 | 83.8 | 0.56 | 0.41 | 0.40 | 0.43 | 0.41 | 0.25 | 0.05 | 0.42 | 2.6 | 605 |
| X-11 | 10.3 | 1.79 | 86.6 | 0.46 | 0.47 | 0.47 | 0.46 | 0.34 | 0.21 | 0.16 | 0.47 | 2.6 | 568 |
| X-12 | 19.1 | 1.75 | 96.5 | 0.50 | 0.44 | 0.48 | 0.52 | 0.48 | 0.23 | 0.10 | 0.47 | 4.1 | 645 |
| X-13 | -85.4 | 2.56 | 89.1 | 0.60 | 0.60 | 0.59 | 0.60 | 0.53 | 0.38 | 0.19 | 0.69 | 5.4 | 680 |
| X-14 | 35.1 | 1.57 | 83.2 | 0.48 | 0.47 | 0.49 | 0.41 | 0.23 | 0.06 | 0.06 | 0.66 | 6.2 | 500 |
| X-15 | Less than -100.0 | 1.54 | 83.1 | 0.48 | 0.47 | 0.47 | 0.48 | 0.49 | 0.31 | 0.21 | 0.52 | 1.8 | 670 |
| X-16 | -95.0 | 1.43 | 93.8 | 0.48 | 0.48 | 0.50 | 0.51 | 0.45 | 0.31 | 0.11 | 0.40 | 5.7 | 660 |
| X-17 | -100.0 | 1.46 | 80.2 | 0.50 | 0.45 | 0.47 | 0.46 | 0.45 | 0.37 | 0.19 | NR | NR | 670 |
| X-18 | -100.0 | 1.57 | 83.8 | 0.48 | 0.47 | 0.48 | 0.48 | 0.48 | 0.34 | 0.18 | 0.47 | 7.0 | 670 |
| Commercial: | | | | | | | | | | | | | |
| A | 34.0 | 1.92 | 95.6 | 0.39 | 0.31 | 0.36 | 0.27 | 0.35 | 0.29 | 0.12 | 0.42 | 1.8 | NR |
| B | -2.0 | 1.65 | 89.5 | 0.54 | 0.44 | 0.36 | 0.29 | 0.18 | 0.14 | 0.10 | 0.60 | NR | 340 |
| C | 72.0 | [2] 1.62 | 80.9 | 0.52 | 0.40 | 0.42 | 0.50 | 0.34 | 0.11 | 0.07 | 0.57 | 3.2 | 575 |
| D-1 | 15.2 | 1.56 | 96.4 | 0.36 | 0.36 | 0.40 | 0.40 | 0.43 | .42/.03 | NR | 0.47 | 5.2 | 700 |
| D-2 | 19.5 | 1.60 | 97.8 | 0.56 | 0.51 | 0.58 | 0.61 | 0.63 | 0.42 | NR | 0.61 | 4.5 | 705 |
| D-3 | 30.0 | 1.60 | 94.4 | 0.57 | 0.49 | 0.35 | 0.25 | 0.17 | 0.19 | NR | NR | NR | 365 |

[1] Temp. at which friction drops to 0.40 at 25 ft./min.
[2] Wire backing removed.
NR. No reading recorded.

From a consideration of the resulting data given in Table II, it will be evident that the aforesaid tests conducted on the friction elements of this invention show them to be relatively soft, all but one of them having a Rockwell "M" hardness substantially under 47. A number of the samples such as X–1, X–2, X–13, and X–15 to 18 are extremely soft but without in any way imparing the frictional properties of such friction elements. It will also be noted that the percentage theoretical density of the tested elements fall in the range extending from about 80 to 99% with the majority below 90%. Low percentage theoretical density is often associated with high wear, but it will be seen that the wear of the materials of this invention are well within the commercial range and many are very low.

It will further be evident from the coefficient of friction obtained with the friction elements of this invention at various temperatures that such elements have a relatively high coefficient of friction which is exceedingly stable to temperature and over a wide range thereof. See for example X–5, X–6, X–7, X–13 and X–15 to 18. Even at temperatures as high as 700° F. the coefficient of friction of the elements of this invention are still in a high range capable of giving good effectiveness in a brake structure. Moreover, the high speed coefficient of friction in the majority of cases is substantially above 0.10, which is an indication of unusual temperature stability under extreme conditions of temperature. Furthermore the recovery coefficient in the case of practically all the different compositions used for making the elements of this invention show the absence of any severe over-recovery or under-recovery and compare favorably with commercial linings. It will further be noted from Table II that the fade points for the materials of this invention are extremely high, the majority being above 650° F. Note for example the results obtained for compositions X–2, X–5, X–6, X–7, and X–8, X–13 and X–15 to 18 these having not only excellent fade resistance but also very uniform friction coefficients over a wide temperature range. Composition X–7 has a very uniform friction characteristic coupled with low wear and good fade resistance. Composition X–13 has a very high level of friction and good fade characteristic, but in spite of the extremely high friction characteristic, it is still extremely quiet in operation on a brake. In fact, none of the compositions of this invention when operated on a passenger car brake and road tested, exhibited objectionable noise or chatter. The excellent characteristics of the friction elements of this invention are to be contrasted with those of a few representative commercial materials, data for which is given in Table II. Thus commercial material A is a compressed woven lining which consists of filled rubber, calendered upon a wire reinforced asbestos cloth. Such a lining is widely employed on brakes, but as evident from the table, this materail possesses a very low frictional level as compared with the friction elements of the subject invention and hence relatively speaking has a very low effectiveness in a brake structure. Commercial material B is a resin based, extruded lining. The table indicates that material B has very high initial friction, but this falls off very rapidly at elevated temperatures, thus exhibiting very poor fade characteristics.

Commercial material C is a roll-extruded, wire-back lining employing an oil-modified resin binder. This material is widely used on passenger car brakes and is currently considered to be an excellent commercial material. It is to be noted, however, that the fade point of this material is much lower than that obtained with the friction elements of the present invention. Moreover, the friction level as compared to the elements of this invention is more variable and at elevated temperatures such as 700° F., this material has in comparison to the elements of this invention a lower coefficient of friction.

The materials designated by the prefix D are dry-molded, resin-based brake linings containing what are claimed to be unique friction modifiers, and are made from the same composition. The results of three separate tests shown in Table II by identifications D–1, D–2, D–3 illustrate an erratic friction level behavior pattern peculiar to many high coefficient of friction materials. Thus D–1 shows a relatively low coefficient characteristic, although it appears to have good fade resistance. Sample D–2 of the same composition shows a high level of friction and good fade resistance, yet sample D–3 of the same lining shows a high initial friction coefficient which falls off rapidly with increasing temperature thus exhibiting early fade. It should be evident that a friction element such as D when placed on a passenger car brake, would give very erratic performance and this has actually been shown in road car tests. It will also be noted that material D exhibits excessive wear on cast iron brake drums. In contrast to the results obtained with material D, it will be noted that the materials of the present invention exhibit very stable friction performance over a wide temperature range and from repeated tests have of the examples given not shown the slightest indication of erratic behavior or a tendency to burn or wear the brake drums.

It will be apparent from the above description of the several methods for processing and curing the friction elements of this invention that a wide range of cures may be followed with satisfactory results. In this connection, we have discovered that the hardness of the friction elements of this invention may be increased where desired and while staying within the safe hardness limits without markedly affecting the friction properties of such elements by adjusting the conditions of cure to the hardness desired. Thus when the cures are effected at the higher temperatures of those indicated or for longer periods of time, any increase in hardness of the friction elements resulting thereby does not markedly affect the friction properties. Some idea of this may be noted from Table III below which gives some indication of the effect of cure on properties of the friction elements, a number of different cures being recorded for the same friction element composition.

TABLE III.—EFFECT OF CURE ON PROPERTIES

| Number | Temp., ° F. | Cure Time, Hrs. | Coefficient of Friction at— | | | $R_M$ Hardness |
|---|---|---|---|---|---|---|
| | | | Room Temp. | 300° F. | 400° F. | |
| X3–1 | 450 | 6 | 0.52 | 0.47 | 0.43 | 0.0 |
| X3–2 | 500 | 6 | 0.41 | 0.43 | 0.45 | 56.7 |
| X3–3 | 600 | 6 | 0.41 | 0.42 | 0.44 | 59.4 |
| X3–4 | 650 | 6 | 0.39 | 0.41 | 0.42 | 50.9 |
| X7–1 | 350 | 6 | 0.51 | 0.49 | 0.51 | 11.4 |
| X7–2 | 400 | 6 | 0.47 | 0.47 | 0.51 | 12.4 |
| X7–3 | 450 | 6 | 0.47 | 0.46 | 0.49 | 20.0 |
| X15–1 | 350 | 6 | 0.48 | 0.47 | 0.47 | [1] 34.9 |
| X15–2 | 500 | 6 | 0.53 | 0.50 | 0.47 | [1] 95.4 |
| X15–3 | 350 | 14 | 0.49 | 0.47 | 0.45 | [1] 61.3 |
| X15–4 | 400 | 14 | 0.50 | 0.48 | 0.49 | [1] 84.8 |
| X15–5 | 400 | 1 | 0.46 | 0.48 | 0.50 | [1] 7.2 |
| X15–6 | 400 | 2¼ | 0.47 | 0.46 | 0.48 | [1] 21.2 |
| X15–7 | 400 | 4¼ | 0.45 | 0.46 | 0.48 | [1] 26.8 |

[1] AA—Scale hardness.

From Table III it will be seen that for a friction element having the composition X–3, increasing the temperature of cure from 450° F. to 500° F. increases the hardness of the resulting friction element and lowers somewhat the room temperature friction, but has no effect on the friction level at higher temperatures. For material X–7 in the table, increasing the cure temperature from 350° to 450° progressively increases the hardness with slight effect on the coefficient of friction. For material X–15, which is the preferred material of this invention, increasing the curing temperature from 350° F. to 500° F. increases the hardness but does not affect adversely the level of friction. Moreover, increasing the time of cure for this material at 350° F. from 6–14 hours, materially affects the hardness without any effect on friction level. Similarly, where the elements are cured at 400° F., small differences in the time of cure, for example between 1, 2¼, and 4¼ hours' cure time results in increased hardness without any material change in the friction level.

It will be understood that for the friction elements of this invention we prefer to maintain the hardness of the elements at as low a level as is compatible with desired performance, and the ranges given in Table III are all considered quite satisfactory. Moreover, it will be observed that the hardness factors for material X-15 is based on a different hardness scale, to wit, the AA scale which is used for very soft plastic materials. The reason for this is that the corresponding $R_M$ scale readings corresponding to $R_{AA}$ readings of 34.9, 7.2, 21.2, and 26.8 given in the table would all be less than minus 100 hardness. It will, therefore, be apparent that these are exceptionally soft friction elements.

The friction elements of this invention are moreover quite stable in their friction characteristics under changes in load. We have observed in performance tests on, for example the friction dynamometer, that with commercial friction elements, a change in load will markedly affect the level of friction. In this connection, we have noted that commercial material D recorded in Table II has the undesired characteristic of giving higher friction at higher loads so that erratic performance is observed when this material is used on a brake. In contrast thereto, Table IV below records the results obtained, for example, with material X-7 of this invention by changing the load.

TABLE IV.—STABILITY OVER LOAD RANGE OF X-7

| Material | p.s.i. Load | Room Temp. | 300° F. | 400° F. | 500° F. | 600° F. | 700° F. | Coeff. Max. Rec. | Wear in inch |
| --- | --- | --- | --- | --- | --- | --- | --- | --- | --- |
| X7-1 | 151 | 0.47 | 0.47 | 0.49 | 0.51 | 0.50 | 0.29 | 0.48 | 0.006 |
| X7-2 | 99 | 0.48 | 0.48 | 0.52 | 0.53 | 0.48 | 0.26 | 0.49 | 0.004 |
| X7-3 | 51 | 0.43 | 0.51 | 0.54 | 0.53 | 0.45 | 0.22 | 0.47 | 0.0007 |

From the table it will be noted that changing the load three-fold from 51 to 151 p.s.i., has only a very slight effect on the level of friction although wear is considerably improved with the lighter load. This is another important feature of the materials of the subject invention and one that is highly desired for obtaining stable performance results.

The several methods for processing and curing the friction elements of our invention described above make it evident that a wide range of cures may be followed with satisfactory results. In this connection it has been noted that when the friction elements of this invention are cured under conditions which depart from the normal time temperature conditions required for curing any given element by employing either an excess of time of cure or higher temperatures than those required in Table III, there is an increase in hardness of the elements so treated but without markedly affecting in an adverse way the friction properties of such elements. Although it is preferred that the friction elements for automotive use be as soft as possible, the feature of increased hardness while retaining the comparable friction properties could be of advantage in some possible instances and may be contrasted with the results obtained with friction elements employing binders essentially of resin where increased hardness results from the use of greater quantities of resin and the friction properties obtained thereby are materially and adversely affected.

From dynamometer tests and road testing in passenger vehicles of different weights and using different braking systems, it has been found that by the teachings of this invention it is possible to obtain friction elements for use in automotive vehicles that will permit universality of application thereto; lower pedal pressures in non-power brake systems assuring less fatigue in such operations; shorter pedal travel in all systems to obtain the same effectiveness in braking now possible; and superior brake performance by way of improved stability and fade resisting characteristics making driving in hilly and mountainous country safer by permitting more frequent brake applications without loss of effective braking. Moreover, the preferred composition X-15 also provides a freedom from drum scoring and burning not heretofore possible under conditions of severe thermal abuse and greatly improves the noise-free operational level of the braking system.

From the foregoing description of our invention it will be apparent that we have provided a unique composition for friction elements, and methods of producing the same. It will be understood that various modifications and changes in the composition of the friction elements within the limits stated may be made by those skilled in the art without departing from the spirit and intent of our invention. Accordingly all such modifications, changes and equivalent structures and methods are contemplated.

We claim:

1. A substantially homogeneous compacted composition for use as a friction element and having good friction stability consisting essentially of a major portion by weight of particles comprising friction material the greater portion of which is filamentous material and a minor but substantial portion by weight of a binder consisting essentially of an uncured synthetic butadiene acrylonitrile copolymer substantially insoluble in organic solvents and having a high gel fraction and a Mooney viscosity of above 90, said copolymer containing more than about 35% by weight of acrylonitrile.

2. A substantially homogeneous compacted composition for use as a friction element and having good friction stability consisting essentially of a major portion in the order of 40% and more by weight of filamentous asbestos friction material and a minor but substantial portion by weight of a binder consisting essentially of an uncured synthetic butadiene acrylonitrile copolymer substantially insoluble in organic solvents and having a high gel fraction and a Mooney viscosity of above 90, said copolymer containing more than about 35% by weight of acrylonitrile.

3. A substantially homogeneous compacted composition for use as a friction element and having good friction stability consisting essentially of a major portion by weight of filamentous friction material and granular particles each substantially infusible at temperatures between 600° to 900° F. and a minor portion between 11 to 22% by weight of a binder consisting essentially of an uncured synthetic butadiene acrylonitrile copolymer substantially insoluble in organic solvents and having a high gel fraction and a Mooney viscosity of above 90, said copolymer containing more than about 35% by weight of acrylonitrile.

4. A friction element having good friction stability and fade resistance comprising the heat cured product of a substantially homogeneous composition consisting essentially of a major portion by weight of particulate material including filamentous friction material in greatest amount and a binder in amount between about 11 to 22% by weight of the cured composition consisting essentially of an uncured particulate synthetic butadiene acrylonitrile copolymer substantially insoluble in organic solvents and having a high gel fraction and a Mooney viscosity of above 90, said copolymer containing more than about 35% by weight of acrylonitrile.

5. A composition for friction elements having good friction stability comprising essentially a major portion by weight of inorganic filamentous friction material and a minor portion of a discrete particle binder interspersed to provide a substantially homogeneous mass, said binder particles consisting essentially of an uncured high gel synthetic butadiene acrylonitrile copolymer substantially insoluble in organic solvents and constituting between about 11 to 22% by weight of the cured composition, said copolymer containing more than about 35% by weight of acrylonitrile.

6. A friction element for automotive brakes and the like and having good friction stability over a wide range of temperatures and good fade resistance comprising the heat cured product of a substantially homogeneous composition consisting essentially of a major portion by weight of filamentous material, inorganic and organic fillers of granular friction material and a minor portion by weight of an uncured particulate binder consisting essentially of a high gel synthetic butadiene acrylonitrile copolymer substantially insoluble in organic solvents and constituting between about 25 to 55% by volume of the composition, said copolymer containing more than about 35% by weight of acrylonitrile.

7. A friction element having good friction stability and fade resistance comprising the heat cured product of a substantially homogeneous composition consisting essentially of a major portion by weight of friction material including filamentous material in a major amount and a granular material in minor amount, and a minor portion by weight of a binder consisting essentially of a major part of an uncured high gel synthetic butadiene acrylonitrile copolymer substantially insoluble in organic solvents and a minor part of a thermosetting resin, said copolymer containing more than about 35% by weight of acrylonitrile.

8. A friction element having good friction stability and fade resistance comprising the heat cured product of a substantially homogeneous composition consisting essentially of a major portion by weight of friction material including filamentous material in a major amount and a granular material in minor amount, and a minor portion by weight of a binder consisting essentially of a major part of discrete particles of an uncured high gel synthetic butadiene acrylonitrile copolymer substantially insoluble in organic solvents and a minor part of a synthetic phenol-aldehyde resin, said copolymer containing more than about 35% by weight of acrylonitrile.

9. A friction element having good friction stability and fade resistance comprising the heat cured product of a substantially homogeneous composition consisting essentially of a major portion by weight of friction particulate material comprising principally filamentous material and a minor portion between 11 to 22% by weight of the cured composition of a binder consisting essentially of an uncured particulate synthetic butadiene acrylonitrile copolymer substantially insoluble in organic solvents and having a high gel fraction and a Mooney viscosity of above 90 and a thermosetting resin constituting less than about 15% by weight of the total binder content, said copolymer containing more than about 35% by weight of acrylonitrile.

10. A friction element for automotive brakes and the like which element has good friction stability, fade resistance and inhibits scoring and burning of the brake drums comprising the heat cured product of a substantially homogeneous composition consisting essentially of a major portion by weight of particulate material, the greater part of which is filamentous friction material; and a minor portion by weight of a binder consisting essentially of an uncured particulate synthetic butadiene acrylonitrile copolymer having a high gel fraction and a Mooney viscosity of above 90 and being substantially insoluble in organic solvents; the said element being substantially free of elemental and combined sulphur and said copolymer containing more than about 35% by weight of acrylonitrile.

11. A friction element having good friction stability and fade resistance comprising the heat cured product of a substantially homogeneous composition consisting essentially of a major portion by weight of particulate material including inorganic filamentous friction material in greatest amount, an uncured particulate synthetic vulcanizable butadiene acrylonitrile copolymer substantially insoluble in organic solvents and having a high gel fraction and a Mooney viscosity of above 90 in amount between about 11 to 22% by weight of the composition and sulphur in an amount less than 10% by weight of the copolymer, said copolymer containing more than about 35% by weight of acrylonitrile.

12. A friction element having good friction stability and fade resistance comprising the heat cured product of a substantially homogeneous composition consisting essentially of a major portion by weight of particulate friction material substantially infusible at 600° F. and including fibrous material in greatest amount and a minor portion by weight of a binder for the friction material consisting essentially of an uncured synthetic butadiene acrylonitrile copolymer substantially insoluble in organic solvents, said element having a relatively uniform and high level of friction above about 0.4 over a wide temperature range and said copolymer containing more than about 35% by weight of acrylonitrile.

13. A composition friction element of substantially homogeneous character having good friction stability and fade resistance comprising friction particles predominantly of inorganic fibrous material, in amount between about 78 to 89% by weight of the dry ingredients of the composition, the remainder of said composition comprising in situ cured binder material consisting essentially of an uncured particulate synthetic butadiene acrylonitrile copolymer substantially insoluble in organic solvents and having a high gel fraction and a Mooney viscosity of above 90, said copolymer containing more than about 35% by weight of acrylonitrile.

14. A composition friction element of substantially homogeneous character having good friction stability and fade resistance comprising friction particles in amount between about 45% to about 75% of the total volume of the dry ingredients of the composition including inorganic filamentous material and organic particles substantially infusible at 600° F., and binder material in amount between about 25% to about 55% by volume of the dry ingredients of the composition, said binder material being cured in situ and consisting essentially of uncured synthetic butadiene acrylonitrile copolymer particles substantially insoluble in organic solvents and having a high gel fraction and a Mooney viscosity of above 90, said copolymer containing more than about 35% by weight of acrylonitrile.

15. A friction element having good friction stability and fade resistance comprising the heat cured product of a substantially homogeneous composition consisting essentially of a major portion by weight of friction particulate material including in greatest amount filamentous material, and a minor portion by weight of a binder for for said particulate material consisting essentially of an uncured particulate synthetic butadiene acrylonitrile copolymer substantially insoluble in organic solvents and having a high gel fraction and a Mooney viscosity of about 90 and a thermosetting resin comprising the heat reaction product of an aldehyde and a preformed polyphenyl borate, the said thermosetting resin being present in amount less than about 15% by weight of the total binder content and said copolymer containing more than about 35% by weight of acrylonitrile.

16. A friction element comprising the heat cured product of a substantially homogeneous composition consisting essentially of a major portion by weight of friction particulate material substantially infusible at a temperature of 600° F. and including filamentous material in greatest amount and a minor portion at least 11% by weight of the cured composition of a binder therefor consisting essentially of an uncured tackified synthetic butadiene acrylonitrile copolymer substantially insoluble in organic solvents and having a high gel fraction and a Mooney viscosity of above 90, said copolymer containing more than about 35% by weight of acrylonitrile.

17. A method of making friction elements having good friction stability and fade resistance comprising heat curing a substantially homogeneous composition consisting essentially of a major portion by weight of particles comprising friction material predominantly in fibrous form and a minor portion by weight of a binder consisting essentially of an uncured synthetic butadiene acrylonitrile copolymer substantially isoluble in organic solvents and having a high gel fraction and a Mooney viscosity of above 90, said copolymer containing more than about 35% by weight of acrylonitrile.

18. A method of making friction elements having good friction stability and fade resistance comprising forming a substantially homogeneous mixture consisting essentially of a major portion by weight of friction particles comprising asbestos fibre, and a minor portion between about 11 to 22% of the weight of the dry ingredients of the mixture of a binder consisting essentially of uncured discrete particles of a synthetic butadiene acrylonitrile copolymer of more than about 35% by weight acrylonitrile content, which copolymer is substantially insoluble in organic solvents and has a high gel fraction, making elements from said mixture and curing said elements.

19. A method of making friction elements for automotive brakes and the like which elements have good friction stability and fade resistance and which inhibit burning and scoring of the brake drums comprising forming a substantially homogeneous mixture comprising friction particles substantially infusible at a temperature of 600° F. and including a predominant amount of inorganic filamentous material, and a binder therefor in amount between about 25% to about 55% by volume of the dry ingredients of the mixture, the said binder consisting essentially of discrete high gel particles of an uncured synthetic butadiene acrylonitrile copolymer of more than about 35% by weight acrylonitrile content, which copolymer is substantially insoluble in organic solvents, the said mixture being substantially free of elemental and combined sulphur, making elements from the mixture and curing said elements by means of heat.

20. A method of making friction elements having good friction stability and fade resistance at low and high temperatures comprising forming a substantially homogeneous mixture consisting essentially of a major portion by weight of friction particulate material including filamentous material in greatest amount and a binder in amount between 11 to 22% by weight of said mixture, said binder consisting essentially of discrete particles of an uncured synthetic butadiene acrylonitrile copolymer of more than about 35% by weight acrylonitrile content, which copolymer is substantially insoluble in organic solvents, making elements from the mixture and curing the elements in the presence of heat at a temperature above about 350° F. and below 600° F.

21. A method of making friction elements having good friction stability and fade resistance comprising forming a substantially homogenerous wet plastic mixture comprising inorganic filamentous friction material, a binder consisting essentially of discrete high gel particles of an uncured synthetic butadiene acrylonitrile copolymer of more than about 35% by weight acrylonitrile content, which copolymer is substantially insoluble in organic solvents, and constituting between about 25% to about 55% by volume of the dry ingredients of the mixture, and a solvent having a tackifying effect on the copolymer, making an element from the mixture, drying the element, densifying the element, and curing the element at a temperature above about 350° F. and below about 600° F.

References Cited in the file of this patent

UNITED STATES PATENTS

| | | |
|---|---|---|
| 2,505,349 | Daly | Apr. 25, 1950 |
| 2,600,024 | Romeyn et al. | June 10, 1952 |
| 2,901,456 | Spokes et al. | Aug. 25, 1952 |

UNITED STATES PATENT OFFICE
CERTIFICATE OF CORRECTION

Patent No. 3,007,890                                            November 7, 1961

Sumner B. Twiss et al.

It is hereby certified that error appears in the above numbered patent requiring correction and that the said Letters Patent should read as corrected below.

Column 2, line 32, for "initialy" read -- initially --; line 53, for "whic" read -- which --; column 3, line 37, for "difinite" read -- definite --; column 5, line 13, for "mealamine" read -- melamine --; column 6, line 6, after "should" insert -- not --; line 32, for '"wollastonite"' read -- "Wollastonite" --; line 45, for "particulate" read -- particle --; column 7, line 54, after "acid" insert -- and --; column 14, line 22, for "performation" read -- performance --; column 15, line 54, for "materail" read -- material --; column 17, line 19, for "moveover" read -- moreover --; column 20, line 68, strike out "for"; column 21, line 22, for "isoluble" read -- insoluble --; column 22, line 27, for "homogenerous" read -- homogeneous --.

Signed and sealed this 24th day of April 1962.

(SEAL)
Attest:

ESTON G. JOHNSON
Attesting Officer

DAVID L. LADD
Commissioner of Patents